United States Patent
Fujimori et al.

(10) Patent No.: US 6,445,923 B1
(45) Date of Patent: Sep. 3, 2002

(54) SELECTIVE WIRELESS PAGING RECEIVER AND RADIO FREQUENCY SEARCHING METHOD THEREFOR

(75) Inventors: Kazuhiko Fujimori; Yasushi Abe; Akihiko Wada, all of Kanagawa; Toshihide Abe, Shizuoka, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/238,374

(22) Filed: Jan. 27, 1999

(30) Foreign Application Priority Data

Jan. 30, 1998 (JP) .......................................... 10-020038

(51) Int. Cl.⁷ ................................................ H04Q 7/20
(52) U.S. Cl. ...................... 455/434; 455/515; 455/67.7; 455/226.1
(58) Field of Search ................................. 455/426, 432, 455/186.1, 434, 551, 435, 76, 515, 226.1, 226.2, 226.3, 226.4, 67.3, 67.7; 370/332, 352

(56) References Cited

U.S. PATENT DOCUMENTS

| | | | | |
|---|---|---|---|---|
| 5,170,413 A | * | 12/1992 | Hess | 375/260 |
| 5,303,400 A | * | 4/1994 | Mogi | 455/186.1 |
| 5,379,451 A | * | 1/1995 | Nakagoshi | 455/435 |
| 5,504,803 A | * | 4/1996 | Yamada | 455/426 |
| 5,754,956 A | * | 5/1998 | Abreu | 455/434 |
| 6,259,915 B1 | * | 7/2001 | Raith | 455/434 |

\* cited by examiner

Primary Examiner—Vivian Chin
Assistant Examiner—John J Lee
(74) Attorney, Agent, or Firm—Pearne & Gordon LLP

(57) ABSTRACT

In a case where a desired radio frequency channel is searched over a plurality of radio frequency channels through manual switching, a received data error detection section 12 detects an error rate of radio data, and an electric field detection section 11 detects a field strength. System information comparison section 6 detects a match or mismatch between the system information of the radio frequency channel and the system information of a wireless selective paging receiver. A display section 3 indicates the result of such detection in the form of an at-a-glance list in decreasing order of receiving probability, thereby enabling the user to select a radio frequency channel having a higher degree of reliability. Further, radio frequency channels which will be covered by a receiving area, system information on each of the radio frequency channels, and area information are stored so as to become associated with one another. As a result, the user can determine a receiving area without involving re-searching of a radio frequency channel at the time of selection of a receivable area.

12 Claims, 3 Drawing Sheets

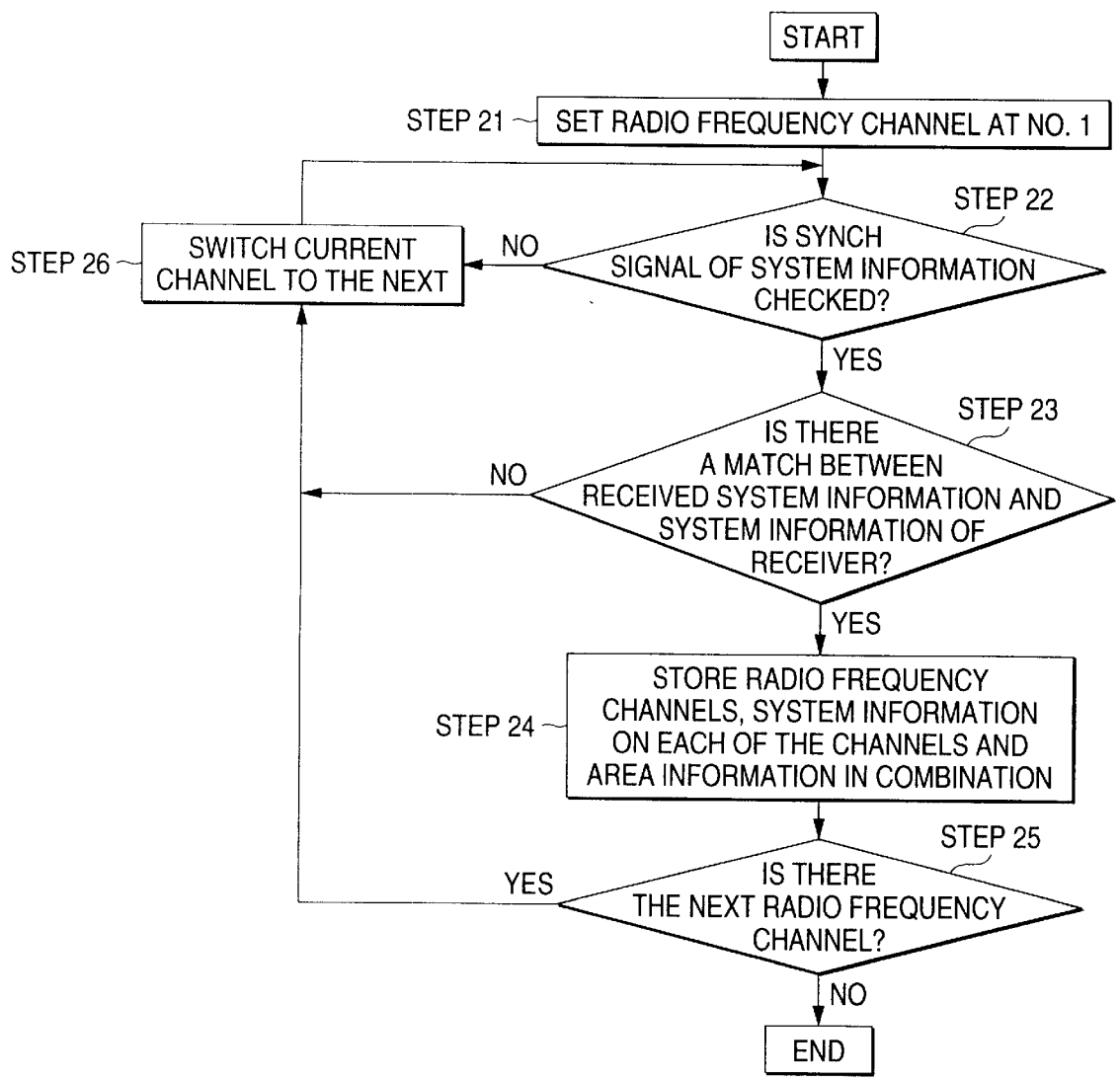

SELECTIVE WIRELESS PAGING RECEIVER AND RADIO FREQUENCY SEARCHING METHOD THEREFOR

BACKGROUND OF THE INVENTION

1. Field of the Invention

The present invention relates to a selective wireless paging receiver to be used in a plurality of wireless paging systems using different radio frequencies, as well as to a radio frequency searching method therefor.

2. Description of the Related Arts

A related selective wireless paging receiver which is used with a plurality of wireless paging system using different radio frequency channels searches a radio frequency band including the radio frequency channels to receive the radio frequency channels selectively. After searching, it is necessary for the paging receiver to make a decision as to whether or not each of the radio frequency channels sequentially received can provide a service to the paging receiver. Each radio frequency channel includes system information to be used for identifying each wireless paging system. The paging receiver compares the system information contained in each of the channels sequentially received with system information stored in the paging receiver.

If there is a match between the system information items each other, the received channel is determined to be a target channel. The paging receiver continuously receives the channel targeted and proceeds to steps for address identification and receipt of a display message.

In contrast, if there is no match between the system information items, the paging receiver switches the radio frequency to another frequency.

According to the related arts, there is another receiver besides the above. The receiver detects the electric field of a radio channel. If a result of such detection is smaller than a certain threshold value, the current channel is switched to the next channel. In contrast, if the detection result exceeds the certain threshold value, the signal is continuously analyzed.

Furthermore, there is known a search method in which the receiver automatically performs the foregoing operations.

However, in a case where the aforementioned selective wireless paging receiver attempts to select and determine one of the radio channels assigned to the receiver through the automatic searching in the area where the radio channels are adjacent to or overlap one another, the paging receiver may be brought into synchronization with an unintended radio channel band.

Also, in a case where the user attempts to select and determine one of the radio channels assigned to the receiver through the manual operations in the area where the radio channels are adjacent to or overlap one another, there is no means to make it possible for the user to judge receiving reliability as to whether or not the radio channel is an intended channel.

SUMMARY OF THE INVENTION

In view of the foregoing problems, the object of the present invention is to provide a selective wireless paging receiver and a radio frequency searching method, receiving reliability as to a receiving area is judged and notified to a user, so that the user can select an intended area.

A selective wireless paging receiver according to the present invention comprises electric field detection means for detecting an electric field of a radio frequency channel, detection means for detecting an error rate of radio channel information and display means for indicating a state of receiving of the radio frequency channel and means for indicate a name or channel number of each receiving area and the receiving reliability of the radio frequency channels, by which the user can select a receiving area having a higher probability of receiving.

The selective wireless paging receiver according to the present invention further comprises means for storing information in combination on the received electric field of the radio frequency channel, information on a radio data error rate, and information on a match or mismatch between system information items. The stored information is used as a sorting condition when the number of the radio frequency channel or the receiving area is indicated on the receiver.

According to the present invention, the radio frequency searching method by which each the receiving area is judged as a receivable area if the receiver can be brought into synchronization with a received frequency and if there is a match between the system information of the received frequency and a plurality of system information items of the receiver. In this method, the radio frequency channels currently received, system information on receiving areas covered with the radio frequency channels, and receiving area information thereon are stored so as to become associated with one another. Therefore, the receiver can specify a radio frequency to be received by selection of solely a receiving area without involving frequency search.

The present invention provides a radio frequency searching method, in which information on the electric field of a radio frequency channel, information on a radio data error rate, and information on a match or mismatch between system information items are stored in combination, thus enabling specification of sorting order of radio channels by utilization of the information.

According to a first aspect of the present invention, there is provided a wireless selective paging receiver which stores a plurality of receiving frequencies of a plurality of wireless paging systems and performs a searching operation through sequential switching of the thus-stored receiving frequencies, the paging receiver comprising means for detecting an electric field of a received frequency and means for indicating in decreasing order of receiving reliability the name or channel number of receiving areas which are covered as a result of sequential switching of radio frequencies to be received and the receiving reliability of the receiving areas. With such a receiver, the user can select a receiving area having the highest receiving ratio by selection of a receiving area having the highest degree of receiving reliability from among indicated receiving areas.

According to a second aspect of the present invention, the wireless selective paging receiver as defined in the first aspect further comprises means for detecting an error rate of received data, wherein the error rate of received data is indicated as the receiving reliability to be indicated.

With such a receiver, the user can select a receiving area having the highest receiving ratio by selection of a receiving area having the lowest error rate of received data.

According to a third aspect of the present invention, there is provided a wireless selective paging receiver which stores received frequencies of a plurality of wireless paging systems, is brought into synchronization with each of receiving frequencies through sequential switching of the thus-stored receiving frequencies, and can determine a receiving area if there is a match between the system information of the received frequency and a plurality of system information items stored in the paging receiver, the paging receiver comprising, means for storing in combination the radio frequencies which are currently received, system information of receiving areas which are covered by the radio frequencies, and receiving area information thereof, and means which indicates the receiving areas and which, when one is selected from the indicated receiving areas, switches the frequency to a radio frequency corresponding to the receiving area.

With such a receiver, the user can determine a receiving area and adjust the receiver to a target radio frequency by selection of only a receiving area from the indicated receiving areas, without involving re-searching of radio frequencies.

According to a fourth aspect of the present invention, there is provided a wireless selective paging receiver which stores receiving frequencies of a plurality of wireless calling systems, is brought into synchronization with each of the receiving frequencies through sequential switching of the thus-stored receiving frequencies, and can determine a receiving area if there is a match between the system information of the received frequency and a plurality of system information items stored in the paging receiver, the paging receiver comprising means for detecting the field strength of the received frequency, means for indicating the name or channel number of receiving areas which are covered as a result of sequential switching of the radio frequency channels to be received and the receiving reliability thereof, in decreasing order of receiving reliability, means for storing in combination the radio frequencies which are currently received, system information of the receiving areas which are covered by the receiving radio frequencies, and receiving area information thereof, and means which, when a receiving area is selected from the receiving area information, switches the frequency to a radio frequency corresponding to the thus-selected receiving area.

With such a receiver, the user can select and determine a receiving area having the highest receiving ratio without involving re-searching of radio frequencies, by selection of a receiving area having the highest degree of receiving reliability from the indicated receiving areas.

According to a fifth aspect of the present invention, the wireless selective paging receiving as defined in the fourth aspect further comprises means for detecting an error rate of received data, wherein the error rate of received data is indicated as the receiving reliability to be indicated.

With such a receiver, the user can select and determine a receiving area having the highest receiving ratio without involving re-searching of radio frequencies, by selection of a receiving area having the highest degree of receiving reliability from the indicated receiving areas.

According to a sixth aspect of the present invention, there is provided a radio frequency searching method for use with a wireless selective paging receiver which stores a plurality of receiving frequencies of a plurality of wireless paging systems and performs a searching operation through sequentially switching of the thus-stored receiving frequencies, wherein the name or channel number of each of receiving areas which are covered as a result of sequential switching of radio frequencies to be received is indicated in decreasing order of receiving reliability, and the user is allowed to select a radio frequency channel from the thus-indicated receiving areas, thereby determining a radio frequency to be received.

By use of the method, the user can select a receiving area having the highest receiving ratio by selection of a receiving area having the lowest error rate of received data.

According to a seventh aspect of the present invention, the radio frequency searching method as defined in the sixth aspect is characterized by an error rate of received data being indicated as receiving reliability to be indicated.

By use of the method, the user can select and determine a receiving area having the highest receiving ratio without involving re-searching of radio frequencies, by selection of a receiving area having the highest degree of receiving reliability from the indicated receiving areas.

According to an eighth aspect of the present invention, there is provided a radio frequency searching method for use with a wireless selective paging receiver which stores receiving frequencies of a plurality of wireless calling systems, is brought into synchronization with each of the receiving frequencies through sequential switching of the thus-stored receiving frequencies, and can determine a receiving area if there is a match between the system information of the received frequency and a plurality of system information items stored in the paging receiver, wherein radio frequencies which are currently received, system information on receiving areas which are covered by the radio frequencies, and receiving area information thereof are stored so as to become associated with one another; the receiving areas are indicated so that the user can select one from the receiving areas; and a radio frequency is determined by selecting the frequency to a radio frequency channel corresponding to the thus-selected receiving area.

By use of the method, the user can select and determine a receiving area having the highest receiving ratio without involving re-searching of radio frequencies, by selection of a receiving area having the highest degree of receiving reliability from the indicated receiving areas.

According to a ninth aspect of the present invention, there is provided a radio frequency searching method for use with a wireless selective paging receiver which stores receiving frequencies of a plurality of wireless calling systems, is brought into synchronization with each of the receiving frequencies through sequential switching of the thus-stored receiving frequencies, and can determine a receiving area if there is a match between the system information of the received frequency and a plurality of system information items stored in the paging receiver, wherein the name or channel number of each of the receiving areas which are covered as a result of sequential switching of the radio frequencies and receiving reliability thereof are indicated in decreasing order of receiving reliability; the radio frequencies which are currently received, system information of the receiving areas which are covered by the radio frequencies, and receiving area information thereof are stored so as to become associated with one another; and the user selects one from the thus-indicated receiving areas, whereby the frequency is switched to a radio frequency corresponding to the thus-selected receiving area and is determined as a radio frequency to be received.

By use of the method, the user can select and determine receiving area having the highest receiving ratio without involving re-searching of radio frequencies, by selection of a receiving area having the highest degree of receiving reliability from the indicated receiving areas.

The radio frequency searching method as defined in the ninth aspect of the present invention is characterized by an error rate of received data being indicated as receiving reliability to be indicated.

By use of the method, the user can select and determine a receiving area having the highest receiving ratio without involving re-searching of radio frequencies, by selection of a receiving area having the highest degree of receiving reliability from the indicated receiving areas.

BRIEF DESCRIPTION OF THE DRAWINGS

FIG. 3 is an operation flowchart of the wireless selective paging receiver according to the second embodiment; and FIG. 4 is a list showing an indication example of the wireless selective paging receivers according to the first and second embodiments.

DETAILED DESCRIPTION OF THE INVENTION (First Embodiment)

Figure 1:
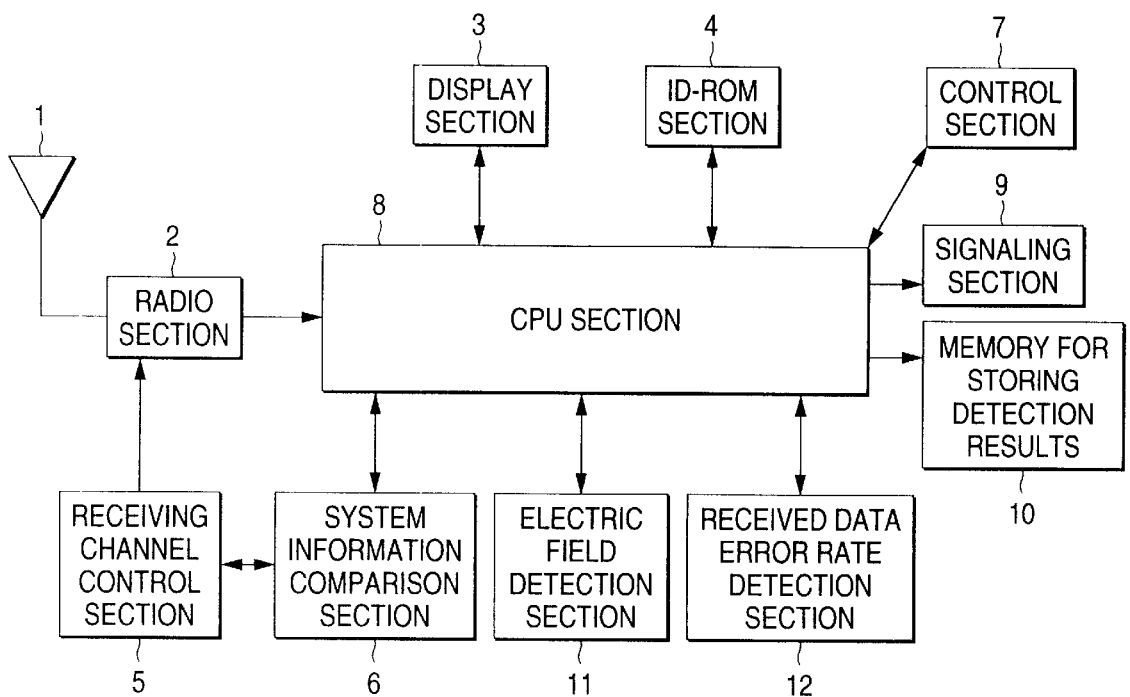
FIG. 1 is a block diagram showing a wireless radio paging receiver according to first and second embodiments of the present invention.

By reference to the accompanying drawings, preferred embodiments will be given of the present invention. FIG. 1 is a block diagram of a selective wireless paging receiver according to a first embodiment of the present invention. The selective wireless paging receiver (hereinafter referred to simply as a "paging receiver") can receive selective paging signals which are transmitted over different radio frequency channels by a plurality of selective wireless paging systems. As shown in FIG. 1, reference numeral 1 designates a receiving antenna; 2 designates a radio section; 3 designates a display section; 4 designates an ID-ROM section; 5 designates a receiving channel control section; 6 designates a system information comparison section; 7 designates a control section; 8 designates a CPU section; 9 designates a signaling section; 10 designates memory for storing each detection result; 11 designates an electric field detection section; and 12 designates a received data error detection section.

Typical receiving operations of the paging receiver having the foregoing configuration will now be described. The receiving antenna 1 and the radio section 2 receives a radio frequency channel corresponding to a local frequency controlled by the receiving channel control section 5. After the paging receiver has been brought into synchronization with the radio frequency channel, a received selective paging signal is demodulated and decoded.

The system information comparison section 6 compares the system information—which is included in the decoded selective paging signal and is used for identifying a plurality of selective wireless paging systems—with the system information regarding the paging receiver stored in the ID-ROM section 4. If there is a match between the system information items, the radio frequency channel is determined as a target channel. Next, a selective paging number contained in the decoded selective paging signal is compared with the selective paging number that is assigned to the paging receiver and is stored in the ID-ROM section 4. If there is a match between the selective paging numbers, it is determined that the selective paging signal is a calling to the present paging receiver. And, the signaling section 9 is activated so as to notify the user of an incoming message. The incoming message is then indicated on the display section 3. The CPU section 8 and the control section 7 control these operations.

Searching a radio frequency channel through a plurality of radio frequency channels by the paging receiver will now be described by reference to FIGS. 2 and 4.

Figure 2:
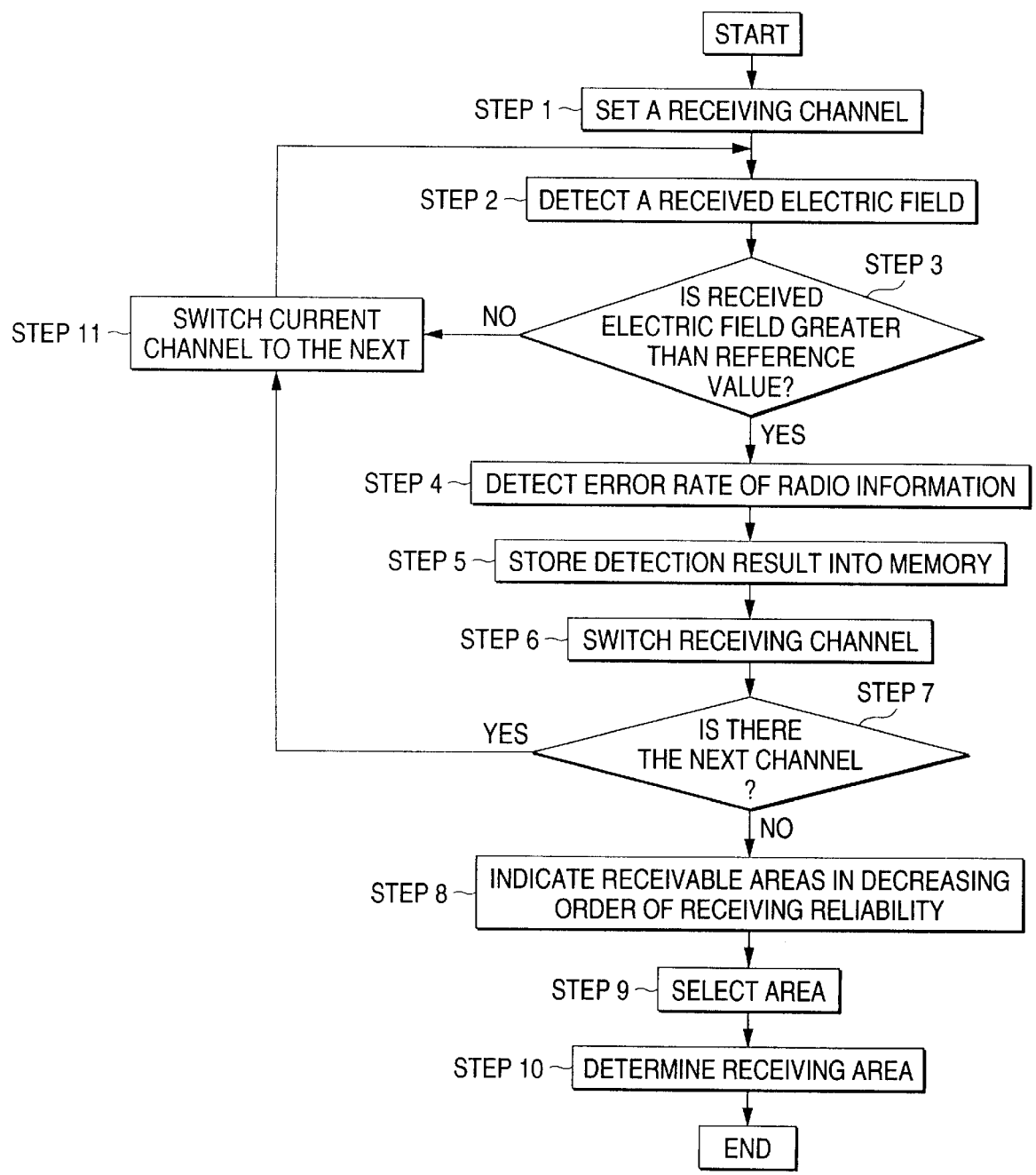
FIG. 2 is an operation flowchart of the wireless selective paging receiver according to the first embodiment.

In FIG. 2, when the paging receiver is activated or the user makes a request for channel search, the CPU section 8 sets a wireless frequency channel, (e.g., channel No. 1), on the radio section 2 (step 1). Subsequently, the electric field detection section 11 detects the strength of a received electric field and stores the thus-detected strength into the memory 10 (step 2). The result of such detection is compared with a reference value (step 3). If the detected value does not exceed the reference value, the radio frequency channel is excluded from receivable channels, and the current radio frequency channel is switched to the next radio frequency channel (step 11). If the detected value is in excess of the reference value and the currently detected radio frequency channel is judged to be receivable, the radio frequency channel is received. The received data error rate detection section 12 detects an error rate of the received signal (step 4), and the result of such detection is stored in the memory 10 (step 5). Next, the receiving channel is switched to the next receiving channel (step 6), and it is checked whether or not there is the next channel (step 7) If there is the next channel, the current channel is switched to the next radio frequency channel (step 11). If there is no next channel, the detection result stored in the memory 10 is analyzed.

As shown in FIG. 4, receivable areas are displayed in decreasing order from the receivable area having the highest degree of receiving reliability (or the receivable area having the smallest error rate of received data) in the form of an at-a-glance list (step 8). The user selects the receiving area having the highest degree of receiving reliability from the list (step 9) and determines the thus-selected receiving area as a receiving area (step 10). The CPU section 8 sets the thus-selected radio frequency channel on the radio section 2, and the paging receiver then commences receiving operations.

As mentioned above, according to the first embodiment, the receivable areas are displayed for the user in the form of an at-a-glance list in decreasing order of receiving reliability (i.e., in increasing order of received data error rate), thereby enabling the user to select a receivable area having a higher receiving ratio. Particularly, in the area where the radio frequency channels are adjacent to or overlap one another in frequency, the user can select a receiving area as taking into consideration the destination toward which the user is currently moving.

(Second Embodiment)

A second embodiment of the present invention will now be described. A selective wireless paging receiver according to the second embodiment is identical to that of the first embodiment. Hence, only the radio frequency searching method used by the paging receiver will be described by reference to FIGS. 3 and 4.

In FIG. 3, in a case where the paging receiver is activated or the user makes a request for frequency search, the CPU section 8 sets the radio frequency channel, e.g., frequency No. 1, on the radio section 2 (step 21). It is checked whether or not a synch signal of the system information included in the received radio frequency channel has been correctly synchronized with (step 22). If the synch signal is not correctly checked, the current channel is switched to the next radio frequency channel (step 26). If the synch signal is correctly checked, the system information comparison section 6 compares the detected system information with the system information regarding the paging receiver (step 23). If there is a match between the system information items, the information—as to whether or not there is a match between the information on the radio frequency channel and the detected system information—and the information on the name of the receiving area are stored in the memory 10 so as to become associated with each other (step 24). Next, it is checked whether or not there is the next radio frequency channel (step 25). If there is the next radio frequency channel, the current frequency channel is switched to the next radio frequency channel (step 26), and the processing procedures following step 22 are repeatedly performed. If the user makes a request for indicating area information, the CPU section 8 indicates on the display section 3 the area information stored in the memory 10. The user selects an intended area from the list of the area information and sets the radio frequency channel of the thus-selected area on the radio section 2.

As mentioned above, according to the second embodiment, the area that can be received through searching operations is stored in the memory 10 so as to become associated with the information on a radio frequency channel correspond to the area and the information as to whether or not there is a match between the system information of the radio frequency channel and the system information of the paging receiver. As a result, the user can set the paging receiver to an intended radio frequency channel by selecting only a receivable area without involving re-searching operations, and the radio frequency channel can be received in that receivable area.

The searching methods according to the first and second embodiments can also be combined together. For example, the area information stored according to the second embodiment is stored in the storage section 10 so as to become associated with the electric field strength information and the information on an error rate of received data, both of which are stored according to the first embodiment. So long as the thus-stored information is indicated on the display section 3, the user can select a receivable area with a higher degree of receiving reliability.

As mentioned above, according to the present invention, a desired radio frequency channel is searched over a plurality of radio frequency channels through manual switching. Thereafter, an error rate of received data, the strength of an electric field, and a match or mismatch between system information items are detected, and the results of such detection are indicated in the form of a at-a-glance list. Thus, the present invention has an advantage of enabling the user to select a radio frequency channel with a higher degree of reliability.

Moreover, radio frequency channels which is received within a receiving area, system information on each of the radio frequency channels, and area information are stored so as to become associated with one another. Therefore, such an association enables the user to determine a receivable area without involving re-searching of radio frequency channels.

What is claimed is:

1. A wireless selective paging receiver comprising:
   means for receiving a plurality of frequencies of a plurality of wireless paging systems;
   means for storing the received frequencies of the plurality of wireless paging systems;
   means for switching the stored received frequencies for conducting a search of the received frequencies;
   means for detecting a strength of an electric field of one of the received frequencies;
   means for detecting an error rate of data received over the received frequency, wherein the error rate of the received data is indicated as a receiving reliability; and
   means for indicating, to a user of said receiver, a name or channel number with the receiving reliability of corresponding receiving areas, sorted in decreasing order of the receiving reliability of the receiving areas.

2. A wireless selective paging receiver according to claim 1 further comprising:
   means for allowing a user of said receiver to switch the frequency to a frequency corresponding to a receiving area selected from the indicated receiving areas.

3. A wireless selective paging receiver comprising:
   means for receiving a plurality of frequencies of a plurality of wireless paging systems;
   means for storing the received frequencies of the plurality of wireless paging systems;
   means for sequentially switching each of the stored received frequencies to be synchronized;
   means for storing a plurality of pre-determined system information items;
   means for determining each receiving area to be receivable if there is a match between system information included in the received frequency and one of the plurality of pre-determined system information items stored in said paging receiver;
   means for storing a correlation of the frequencies which are currently received, the system information of receiving areas which are covered with the corresponding received frequencies, and the receiving area information thereof;
   means for indicating the receivable areas to a user of said receiver; and
   means for switching the frequency to a frequency corresponding to a receiving area selected from the indicated receiving areas.

4. A wireless selective paging receiver comprising:
   means for receiving a plurality of frequencies of a plurality of wireless paging systems;
   means for storing the received frequencies of the plurality of wireless paging systems;
   means for sequentially switching each of the stored received frequencies to be synchronized;
   means for determining a receiving area to be a receivable area if there is a match between system information included in the received frequency and one of the plurality of pre-determined system information items stored in said paging receiver;
   means for storing a correlation of the frequencies which are currently received, the system information of receiving areas which are covered with the corresponding received frequencies, and the receiving area information thereof;
   means for detecting a strength of an electric field of one of the received frequencies;
   means for indicating to a user of said receiver a name or channel number with the receiving reliability of corresponding receiving areas sorted in decreasing order of the receiving reliability; and
   means for allowing a user of said receiver to switch the frequency to a frequency corresponding to a receiving area selected from the receiving areas to be receivable.

5. The wireless selective paging receiving as claimed in claim 4, further comprising means for detecting an error rate of received data, wherein the error rate of received data is indicated as the receiving reliability to be indicated.

6. A radio frequency searching method used with a wireless selective paging receiver comprising the steps of:
   storing a plurality of received frequencies of a plurality of wireless paging systems;
   sequentially switching the stored received frequencies so as to conduct a search operation;

determining a receiving area to be receivable if there is a match between system information included in the received frequency and a plurality of system information items stored in said paging receiver;

indicating to a user a name or channel number and receiving reliability of each receiving area in decreasing order of the receiving reliability; wherein the user selects a frequency channel from the thus-indicated receiving areas, and a radio frequency to be received is thereby determined.

7. The radio frequency searching method as claimed in claim 6, wherein an error rate of the received data is indicated as the receiving reliability.

8. A radio frequency searching method used with a wireless selective paging receiver comprising the steps of:

storing a plurality of received frequencies of a plurality of wireless paging systems;

sequentially switching each of the stored received frequencies to be synchronized;

determining a receiving area to be receivable if there is a match between system information included in the received frequency and a plurality of system information items stored in the paging receiver;

storing in combination the frequencies which are currently received, system information of receiving areas which are covered with the corresponding received frequencies, and receiving area information thereof; and indicating to a user the receivable areas; wherein the user selects a radio frequency channel from the thus-indicated receiving areas and a radio frequency to be received is thereby determined.

9. A radio frequency searching method used with a wireless selective paging receiver comprising the steps of:

storing a plurality of received frequencies of a plurality of wireless paging systems;

sequentially switching each of the received frequencies through the stored received frequencies to be synchronized;

determining a receiving area to be receivable if there is a match between the system information of the received frequency and the plurality of system information items stored in the paging receiver;

indicating to a user a name or channel number and receiving reliability of each of the receiving areas in decreasing order of the receiving reliability; and storing in combination the frequencies which are currently received, system information of receiving areas which are covered with the corresponding received frequencies, and receiving area information thereof; wherein the user selects a radio frequency channel from the thus-indicated receiving areas and a radio frequency to be received is thereby determined.

10. The radio frequency searching method as claimed in claim 9, wherein an error rate of received data is indicated as receiving reliability.

11. A wireless selective paging receiver comprising:

means for receiving a frequency of a plurality of wireless paging systems;

means for storing a plurality of received frequencies of a plurality of wireless paging systems;

means for switching the stored received frequencies for conducting a search of the received frequencies;

means for detecting the strength of the electric field of a received frequency;

means for indicating to a user a name or channel number with a receiving reliability of corresponding receiving areas sorted in order of receiving reliability of the receiving areas.

12. A wireless selective paging receiver according to claim 11 further comprising a means for detecting an error rate of data received over the received frequency; wherein the error rate of the received data is indicated as a receiving reliability.

* * * * *